United States Patent
Wang et al.

(10) Patent No.: US 8,537,361 B2
(45) Date of Patent: Sep. 17, 2013

(54) TESTING METHOD, DEVICE AND SYSTEM FOR SHUTTER GLASSES

(75) Inventors: Chih-Li Wang, New Taipei (TW); Ming-Jen Chan, New Taipei (TW); Yi-Cheng Lee, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 13/526,146

(22) Filed: Jun. 18, 2012

(65) Prior Publication Data
US 2013/0010297 A1    Jan. 10, 2013

(30) Foreign Application Priority Data
Jul. 5, 2011   (TW) ............................... 100123623 A

(51) Int. Cl.
*G01N 21/00*   (2006.01)
(52) U.S. Cl.
USPC ........................................................ 356/434

(58) Field of Classification Search
USPC ........................................................ 356/434
See application file for complete search history.

(56) References Cited

U.S. PATENT DOCUMENTS

| | | | |
|---|---|---|---|
| 2011/0001808 A1* | 1/2011 | Mentz et al. .................... | 348/59 |
| 2012/0081527 A1* | 4/2012 | Richardson et al. ............ | 348/56 |
| 2012/0098824 A1* | 4/2012 | Koo et al. ...................... | 345/419 |

* cited by examiner

*Primary Examiner* — Tu Nguyen

(57) ABSTRACT

A testing system including shutter glasses and a testing device is disclosed. The shutter glasses include a left-eye panel and a right-eye panel. The shutter glasses generate an output signal according to a wireless signal. The testing device provides a trigger signal to the shutter glasses to control turn-on times of the left-eye panel and the right-eye panel. When a light passes through the turned-on panel, a penetrating light is generated. The wireless signal is provided by the testing device. The testing device determines whether the shutter glasses are normal according to the output signal and the penetrating light.

20 Claims, 4 Drawing Sheets

US 8,537,361 B2

TESTING METHOD, DEVICE AND SYSTEM FOR SHUTTER GLASSES

CROSS REFERENCE TO RELATED APPLICATIONS

This application claims priority of Taiwan Patent Application No. 100123623, filed on Jul. 5, 2011, the entirety of which is incorporated by reference herein.

BACKGROUND OF THE DISCLOSURE

1. Field of the Disclosure

The disclosure relates to a testing method, device and system, and more particularly to a testing method, device and system for shutter glasses.

2. Description of the Related Art

General three-dimensional (3D) displays cooperate with specific glasses to display 3D images. The specific glasses are divided into active types and passive types. Typically, the active glasses are referred to as shutter glasses. Since the amount of ghost images of the shutter glasses is minimal, the shutter glasses are widely used.

To ensure the yield rate of the shutter glasses, a tester tests the shutter glasses before leaving a factory. In the conventional testing process, a tester wears the shutter glasses. The tester utilizes an artificial method to observe whether the operations of the shutter glasses are normal. However, the artificial method cannot effectively and quickly determine the quality of the shutter glasses.

BRIEF SUMMARY OF THE DISCLOSURE

In accordance with an embodiment, a testing device, which provides a trigger signal to shutter glasses to control a turn-on time of a left-eye panel of the shutter glasses and control a turn-on time of a right-eye panel of the shutter glasses, comprises a generating module, a sensing module and a determining module. The generating module generates at least one light and a wireless signal. When the light passes through the turned-on panel, a penetrating light is generated. When the shutter glasses receive the wireless signal, the shutter glasses generate an output signal. The sensing module senses the penetrating light to generate a sensing signal. The determining module generates the trigger signal and determines whether the shutter glasses are normal according to the sensing signal and the output signal.

In accordance with a further embodiment, a testing method testing shutter glasses comprising a left-eye panel and a right-eye panel comprises generating a trigger signal to control turn-on times of the left-eye panel and the right-eye panel; generating a light and a wireless signal, wherein when the light passes through the turned-on panel, a penetrating light is generated, and when the shutter glasses receive the wireless signal, the shutter glasses generate an output signal; sensing the penetrating light to generate a sensing signal; and determining whether the shutter glasses are normal according to the sensing signal and the output signal.

In accordance with another embodiment, a testing system comprises shutter glasses and a testing device. The shutter glasses comprises a left-eye panel and a right-eye panel. The shutter glasses generate an output signal according to a wireless signal. The testing device provides a trigger signal to the shutter glasses to control turn-on times of the left-eye panel and the right-eye panel. When a light passes through the turned-on panel, a penetrating light is generated. The wireless signal is provided by the testing device. The testing device determines whether the shutter glasses are normal according to the output signal and the penetrating light.

A detailed description is given in the following embodiments with reference to the accompanying drawings.

BRIEF DESCRIPTION OF THE DRAWINGS

The disclosure can be more fully understood by referring to the following detailed description and examples with references made to the accompanying drawings, wherein.

DETAILED DESCRIPTION OF THE DISCLOSURE

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
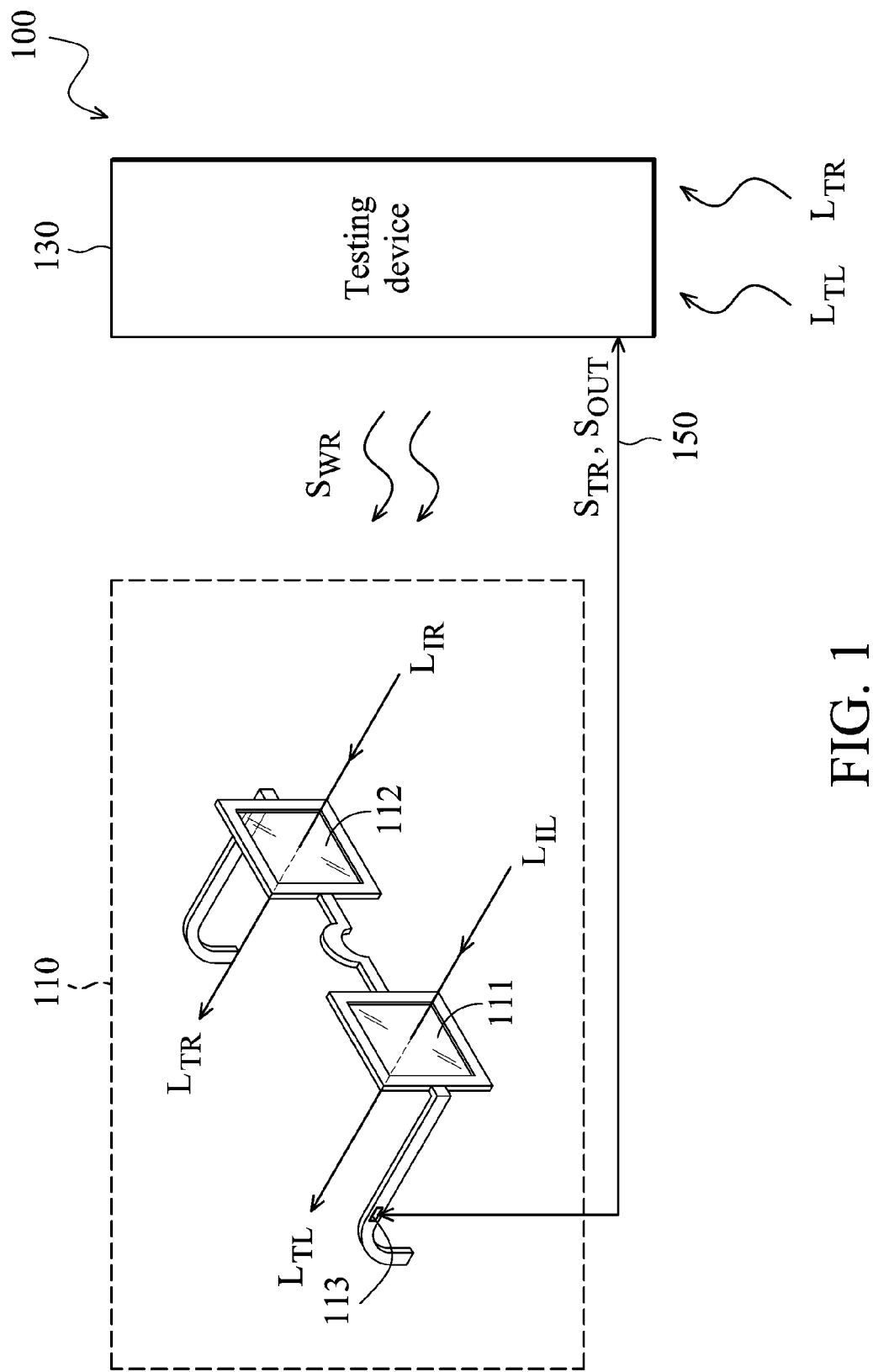
FIG. 1 is a schematic diagram of an exemplary embodiment of a testing system of the disclosure.

FIG. 1 is a schematic diagram of an exemplary embodiment of a testing system of the disclosure. The testing system 100 comprises shutter glasses 110 and a testing device 130. The shutter glasses 110 comprise a left-eye panel 111 and a right-eye panel 112. The disclosure does not limit the kind of the left-eye panel 111 and the right-eye panel 112. In one embodiment, the left-eye panel 111 and the right-eye panel 112 are liquid crystal panels.

In this embodiment, the turn-on times of the left-eye panel 111 and the right-eye panel 112 are controlled by a trigger signal $S_{TR}$. When the left-eye panel 111 is turned on, a light $L_{IL}$ is capable of passing through the left-eye panel 111, wherein the light passing through the left-eye panel 111 is referred to as a penetrating light $L_{TL}$. Similarly, when the right-eye panel 112 is turned on, a light $L_{IR}$ is capable of passing through the right-eye panel 112, wherein the light passing through the right-eye panel 112 is referred to as a penetrating light $L_{TR}$.

The shutter glasses 110 generate an output signal $S_{OUT}$ according to a wireless signal $S_{WR}$. The disclosure does not limit the kind of the wireless signal $S_{WR}$. In one embodiment, the wireless signal $S_{WR}$ is a Radio Frequency (RF) signal or an infrared ray (IR) signal. In another embodiment, the shutter glasses 110 serves the wireless signal $S_{WR}$ as the output signal $S_{OUT}$ and provides the output signal $S_{OUT}$ to the testing device 130.

Based on the output signal $S_{OUT}$ provided by the shutter glasses 110, the testing device 130 determines whether the shutter glasses 110 can normally receive a wireless signal (e.g. $S_{WR}$). Additionally, based on luminous flux of the penetrating light (e.g. $L_{TL}$ or $L_{TR}$), the testing device 130 determines whether the turn-on time of the left-eye panel 111 or the right-eye panel 112 is accurate.

For example, if the turn-on time of the left-eye panel 111 or the right-eye panel 112 is accurate, the luminous flux of the penetrating light (e.g. $L_{TL}$ or $L_{TR}$) is within in a pre-determined range. However, if the luminous flux of the penetrating light (e.g. $L_{TL}$ or $L_{TR}$) is not within the pre-determined range, it represents that the turn-on time of the left-eye panel 111 or the right-eye panel 112 is inaccurate.

In this embodiment, the testing device 130 provides the trigger signal $S_{TR}$ and the wireless signal $S_{WR}$ to the shutter glasses 110. The trigger signal $S_{TR}$ is utilized to control the turn-on times of the left-eye panel 111 and the right-eye panel 112. When a light (e.g. $L_{IL}$ or $L_{IR}$) passes through the turned-on panel (e.g. the left-eye panel 111 or the right-eye panel 112), a penetrating light (e.g. $L_{TL}$ or $L_{TR}$) is generated. Based on the output signal $S_{OUT}$ and the penetrating light (e.g. $L_{TL}$ or $L_{TR}$), the testing device 130 determines whether the shutter glasses 110 are normal.

Additionally, in this embodiment, the testing system 100 further comprises a transmittal cable 150. The transmittal cable 150 is coupled between a transmittal module 113 of the shutter glasses 110 and the testing device 130 to transmit the trigger signal $S_{TR}$ generated by the testing device 130 to the shutter glasses 110 and transmit the output signal $S_{OUT}$ generated by the shutter glasses 110 to the testing device 130.

The disclosure does not limit the kind of the transmittal cable 150. Any cable can serve as the transmittal cable 150, as long as the cable has a bidirectional transmission function. In one embodiment, the transmittal cable 150 is a Universal Serial Bus (USB) cable.

Figure 2:
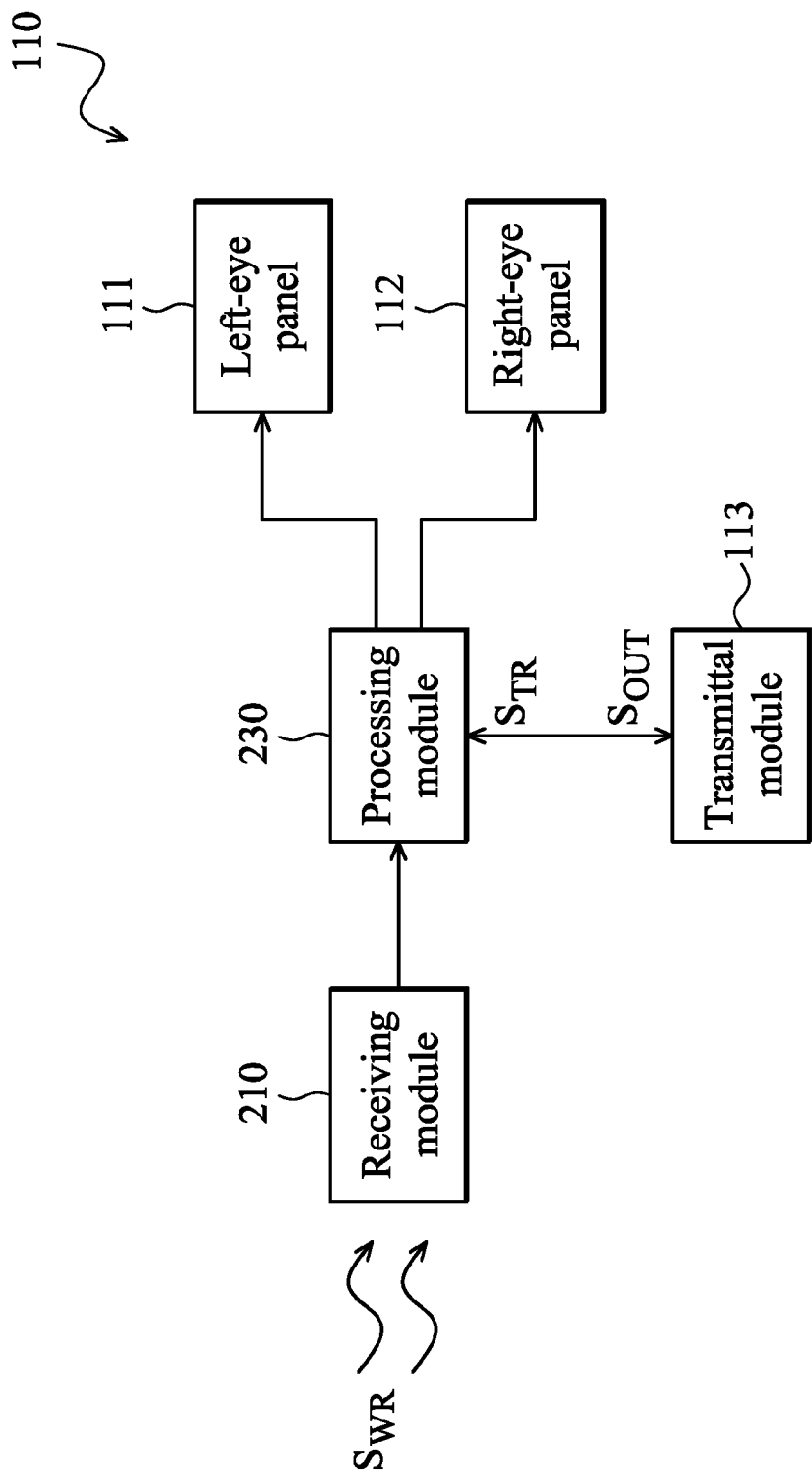
FIG. 2 is a schematic diagram of an exemplary embodiment of shutter glasses of the disclosure.

FIG. 2 is a schematic diagram of an exemplary embodiment of shutter glasses of the disclosure. The shutter glasses 110 comprise a left-eye panel 111, a right-eye panel 112, a transmittal module 113, a receiving module 210 and a processing module 230. In this embodiment, the left-eye panel 111 and the right-eye panel 112 comprise liquid crystal components.

The processing module 230 receives the trigger signal $S_{TR}$ provided by the testing device 130 via the transmittal module 113. In other embodiments, the transmittal module 113 further receives an external power to charge a rechargeable battery (not shown). In this embodiment, the processing module 230 controls the turn-on times of the left-eye panel 111 and the right-eye panel 112 according to the trigger signal $S_{TR}$. In one embodiment, when one panel (e.g. 111) is turned on, another panel (e.g. 112) is turned off.

The receiving module 210 receives the wireless signal $S_{WR}$. The processing module 230 generates the output signal $S_{OUT}$ according to the wireless signal $S_{WR}$ and utilizes the transmittal module 113 to transmit the output signal $S_{OUT}$ to the testing device 130. Based on the output signal $S_{OUT}$, the testing device 130 determines whether the receiving module 210 is normal or not. In one embodiment, the testing device 130 compares the wireless signal $S_{WR}$ with the output signal $S_{OUT}$ and determines whether the receiving module 210 can normally receive the wireless signal $S_{WR}$ according to the compared result.

Figure 3:
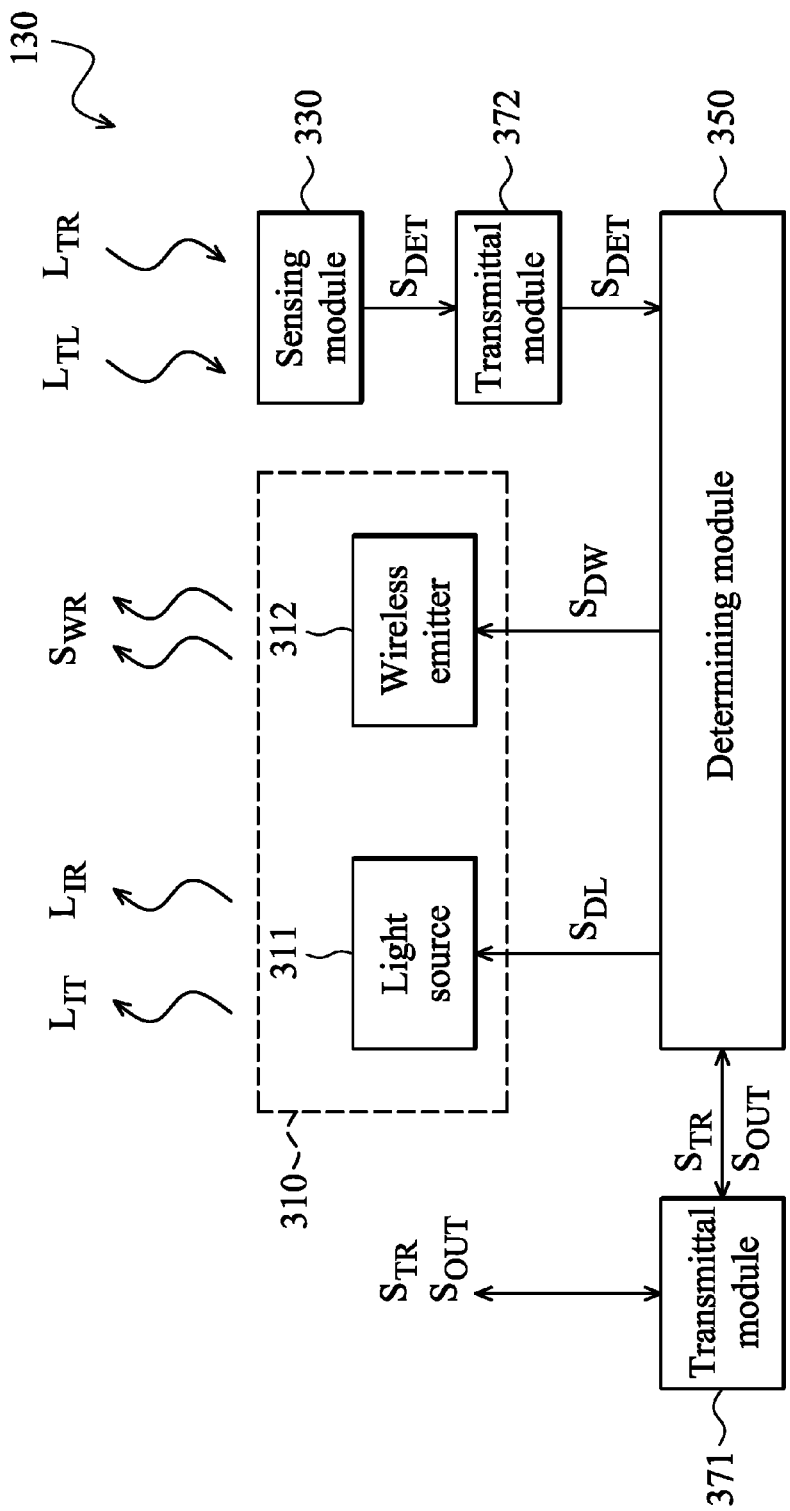
FIG. 3 is a schematic diagram of an exemplary embodiment of a testing device of the disclosure.

FIG. 3 is a schematic diagram of an exemplary embodiment of a testing device of the disclosure. The testing device 130 comprises a generating module 310, a sensing module 330 and a determining module 350. The generating module 310 generates the lights $L_{IL}$, $L_{IR}$ and the wireless signal $S_{WR}$. In this embodiment, the generating module 310 comprises a light source 311 and a wireless emitter 312.

The light source 311 generates the lights $L_{IL}$ and $L_{IR}$. The disclosure does not limit the number of the light source and the kind of the light source. Any device can serve as the light source 311, as long as the device is capable of emitting light. In this embodiment, the lights $L_{IL}$ and $L_{IR}$ are provided by a single light source. In other embodiments, the lights $L_{IL}$ and $L_{IR}$ are provided by two light sources.

The wireless emitter 312 generates the wireless signal $S_{WR}$. The disclosure does not limit the kind of the wireless emitter 312. Any device can serve as the wireless emitter 312, as long as the device is capable of generating a wireless signal. For example, the wireless emitter 312 is an RF emitter or an IR emitter.

The sensing module 330 senses the penetrating light $L_{TL}$ or $L_{TR}$ to generate a sensing signal $S_{DET}$. In this embodiment, the sensing module 330 comprises at least one light sensor to detect the penetrating light $L_{TL}$ or $L_{TR}$. In one embodiment, the sensing module 330 comprises two light sensors. One light sensor detects the penetrating lights $L_{TL}$ and generates a corresponding sensing signal and another light sensor detects the penetrating lights $L_{TR}$ and generates another corresponding sensing signal.

The determining module 350 generates the trigger signal $S_{TR}$ to control the turn-on times of the left-eye panel 111 and the right-eye panel 112. When one panel (e.g. 111 or 112) is turned on, the sensing module 330 generates a corresponding sensing signal $S_{DET}$ according to the luminous flux of the penetrating light ($L_{TL}$ or $L_{TR}$) passing through the turned-on panel. Based on the sensing signal $S_{DET}$, the determining module 350 determines whether the left-eye panel 111 or the right-eye panel 112 can be normally turned on or off.

In addition, based on the output signal $S_{OUT}$, the determining module 350 further determines whether the shutter glasses 110 can normally receive a wireless signal. In this embodiment, the determining module 350 generates driving signals $S_{DL}$ and $S_{DW}$ to drive the light source 311 and the wireless emitter 312, respectively.

In this embodiment, the testing device 130 further comprises transmittal modules 371 and 372. The determining module 350 transmits the trigger signal $S_{TR}$ to the shutter glasses 110 via the transmittal module 371 and receives the output signal $S_{OUT}$ via the transmittal module 371. In this embodiment, the transmittal module 371 utilizes a cable to communicate with the shutter glasses 110.

The transmittal module 372 is coupled between the sensing module 330 and the determining module 350 to transmit the sensing signal $S_{DET}$. In one embodiment, the transmittal module 372 is a cable, such as a Recommended Standard 232 (RS-232) cable, an IEEE 1394 cable or a USB cable, but the disclosure is not limited thereto. The transmittal module 372 is utilized such that the sensing module 330 can communicate with the determining module 350. In another embodiment, the transmittal module 372 is a wireless interface, such as a Bluetooth interface, a Wi-Fi interface or a Zigbee interface, but the disclosure is not limited thereto.

Figure 4:
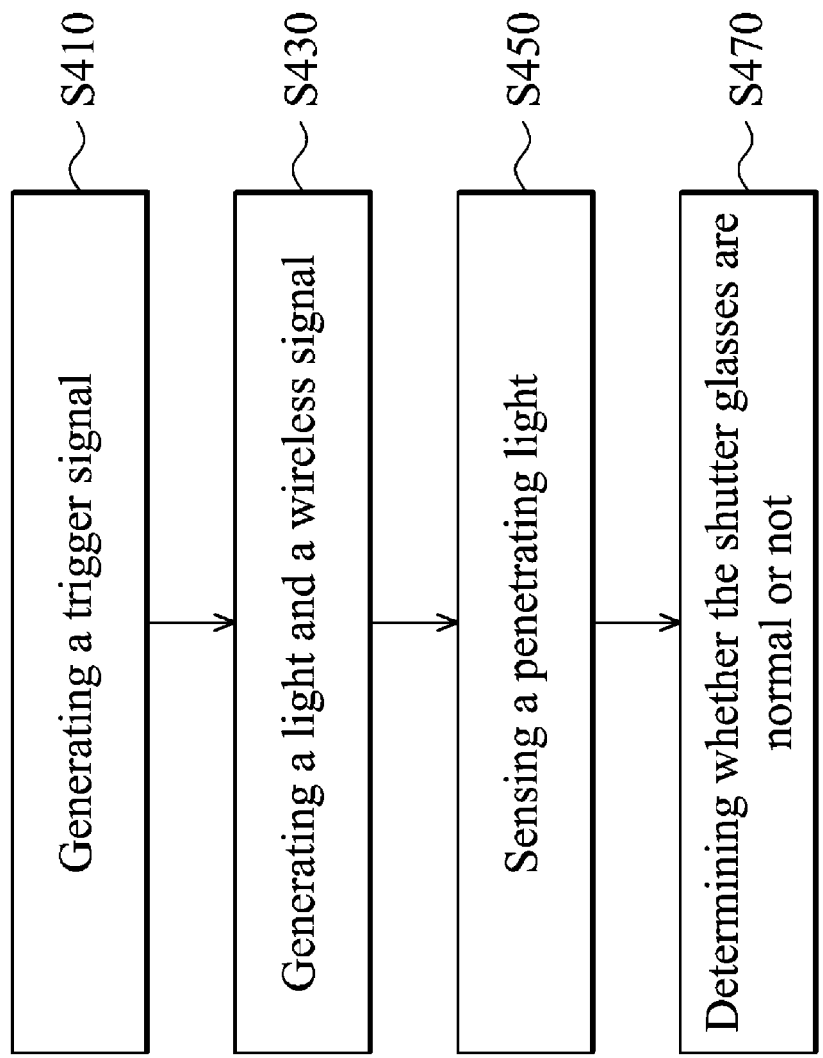
FIG. 4 is a schematic diagram of an exemplary embodiment of a testing method of the disclosure.

FIG. 4 is a schematic diagram of an exemplary embodiment of a testing method of the disclosure. The testing method tests shutter glasses. The shutter glasses comprises a left-eye panel and a right-eye panel. First, a trigger signal is generated to control turn-on times of the left-eye panel and the right-eye panel (step S410). In the disclosure, there is not limitation to the transmittal method of the trigger signal. In one embodiment, a cable is utilized to transmit a trigger signal generated by a testing device to the shutter glasses. In other embodiments, the cable can transmit an output signal generated by the shutter signal to the testing device.

Next, a light and a wireless signal are generated (step S430). In this embodiment, when the light passes through a turned-on panel, a penetrating light is generated. In one embodiment, a light source is utilized to generate the light. In other embodiments, two light sources are utilized to generate two lights. The two lights pass through the left-eye panel and the right-eye panel, respectively. Thus, two penetrating lights are generated.

Additionally, when the shutter glasses receive the wireless signal, the shutter glasses generate an output signal. In one embodiment, the shutter glasses directly serve the wireless signal as the output signal. In addition, the disclosure does not limit the kind of the wireless signal. In one embodiment, the wireless signal is an RF signal or an IR signal.

The penetrating light is sensed to generate a sensing signal (step S450). In this embodiment, a light sensor is utilized to detect the penetrating light passing through the left-eye panel or the right-eye panel. In other embodiments, two light sensors are utilized to detect the penetrating lights passing through the left-eye panel and the right-eye panel.

The sensing signal and the output signal are utilized to determine whether the shutter glasses are normal or not (step S470). The sensing signal relates to the luminous flux of the penetrating light passing through the panel. Thus, if the shutter glasses are abnormal, the luminous flux of the penetrating light may be insufficient or excessive. In this embodiment, it is determined whether the sensing signal is within a pre-determined range. If the sensing signal is not within the pre-determined range, it represents that the panel is abnormal. For example, the sensing signal may be less than a minimum value of the pre-determined range or exceed a maximum value of the pre-determined range. On the contrary, if the sensing signal is within the pre-determined range, it represents that the panel is normal. In one embodiment, the sensing signal may exceed or be equal to the minimum value of the pre-determined range. In another embodiment, the sensing signal may be less than or equal to the maximum value of the pre-determined range.

Additionally, the output signal generated by the shutter glasses is utilized to determine whether the shutter glasses can normally operate according to an external wireless signal. Thus, in this embodiment, the output signal is compared with the wireless signal. If the output signal is not equal to the wireless signal, it represent that a wireless function of the shutter glasses is abnormal. Contrarily, if the output signal is equal to the wireless signal, it represent that the wireless functions of the shutter glasses are normal.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A testing device providing a trigger signal to shutter glasses to control a turn-on time of a left-eye panel of the shutter glasses and control a turn-on time of a right-eye panel of the shutter glasses, comprising:
   a generating module generating at least one light and a wireless signal, wherein when the light passes through the turned-on panel, a penetrating light is generated, and when the shutter glasses receive the wireless signal, the shutter glasses generate an output signal;
   a sensing module sensing the penetrating light to generate a sensing signal; and
   a determining module generating the trigger signal and determining whether the shutter glasses are normal according to the sensing signal and the output signal.

2. The testing device as claimed in claim 1, wherein the generating module comprises:
   at least one light source generating the light; and
   a wireless emitter generating the wireless signal.

3. The testing device as claimed in claim 2, wherein the sensing module comprises:
   at least one light sensor to receive the penetrating light.

4. The testing device as claimed in claim 1, further comprising:
   a first transmittal module coupled between the sensing module and the determining module to transmit the sensing signal.

5. The testing device as claimed in claim 4, further comprising:
   a second transmittal module coupled between the shutter glasses and the determining module to transmit the output signal and the trigger signal.

6. The testing device as claimed in claim 5, wherein one of the first and the second transmittal modules is a Recommended Standard 232 (RS-232) interface, an IEEE 1394 interface, a Universal Serial Bus (USB) interface, a Bluetooth interface, a Wi-Fi interface or a Zigbee interface.

7. The testing device as claimed in claim 1, wherein the wireless signal is a Radio Frequency (RF) signal.

8. A testing method testing shutter glasses comprising a left-eye panel and a right-eye panel, comprising:
   generating a trigger signal to control turn-on times of the left-eye panel and the right-eye panel;
   generating a light and a wireless signal, wherein when the light passes through the turned-on panel, a penetrating light is generated, and when the shutter glasses receive the wireless signal, the shutter glasses generate an output signal;
   sensing the penetrating light to generate a sensing signal; and
   determining whether the shutter glasses are normal according to the sensing signal and the output signal.

9. The testing method as claimed in claim 8, wherein the step of determining whether the shutter glasses are normal according to the sensing signal and the output signal comprises:
   determining whether the sensing signal is within a pre-determined range;
   when the sensing signal is not within the pre-determined range, it represents that the shutter glasses is abnormal; and
   when the sensing signal is within the pre-determined range, it represents that the shutter glasses are normal.

10. The testing method as claimed in claim 9, wherein the step of determining whether the shutter glasses are normal according to the sensing signal and the output signal further comprises:
    comparing the output signal to the wireless signal;
    when the output signal is not equal to the wireless signal, it represents that a wireless function of the shutter glasses is abnormal; and
    when the output signal is equal to the wireless signal, it represents that the wireless function is normal.

11. A testing system comprising:
    shutter glasses comprising a left-eye panel and a right-eye panel, wherein the shutter glasses generate an output signal according to a wireless signal; and
    a testing device providing a trigger signal to the shutter glasses to control turn-on times of the left-eye panel and the right-eye panel, wherein when a light passes through the turned-on panel, a penetrating light is generated, wherein the wireless signal is provided by the testing device, and the testing device determines whether the shutter glasses are normal according to the output signal and the penetrating light.

12. The testing system as claimed in claim 11, wherein the shutter glasses further comprise:
   a receiving module receiving the wireless signal; and
   a processing module controlling the turn-on times of the left-eye panel and the right-eye panel and generating the output signal according to the wireless signal.

13. The testing system as claimed in claim 12, wherein the testing device determines whether the receiving module is normal according to the output signal.

14. The testing system as claimed in claim 11, wherein the testing device comprises:
   a generating module generating the light and the wireless signal;
   a sensing module sensing the penetrating light to generate a sensing signal; and
   a determining module generating the trigger signal and determining whether the shutter glasses are normal according to the sensing signal and the output signal.

15. The testing system as claimed in claim 14, wherein the generating module comprises:
   at least one light source generating the light; and
   a wireless emitter generating the wireless signal.

16. The testing system as claimed in claim 15, wherein the sensing module comprises:
   at least one light sensor receiving the penetrating light and generating the sensing signal.

17. The testing system as claimed in claim 14, wherein the testing device further comprises:
   a transmittal module coupled between the sensing module and the determining module to transmit the sensing signal.

18. The testing system as claimed in claim 11, further comprising:
   a transmittal cable coupled between the shutter glasses and the testing device to transmit the trigger signal generated by the testing device to the shutter glasses and transmit the output signal generated by the shutter glasses to the testing device.

19. The testing system as claimed in claim 18, wherein the transmittal cable is a USB cable.

20. The testing system as claimed in claim 11, wherein the testing device determines whether the turn-on times of the left-eye panel and the right-eye panel are accurate according to the luminous flux of the penetrating light.

* * * * *